(12) United States Patent
Haslov et al.

(10) Patent No.: US 8,637,115 B2
(45) Date of Patent: Jan. 28, 2014

(54) SYSTEMS AND METHODS FOR PURGING UV CURING TUBES

(75) Inventors: Peter Haslov, Solrod Strand (DK); Kariofilis Konstadinidis, Decatur, GA (US); Harry Garner, Lawrenceville, GA (US)

(73) Assignee: OFS Fitel, LLC, Norcross, GA (US)

( * ) Notice: Subject to any disclaimer, the term of this patent is extended or adjusted under 35 U.S.C. 154(b) by 1027 days.

(21) Appl. No.: 12/647,053

(22) Filed: Dec. 24, 2009

(65) Prior Publication Data

US 2011/0159178 A1    Jun. 30, 2011

(51) Int. Cl.
| | | |
|---|---|---|
| B05D 5/06 | (2006.01) | |
| C08F 2/46 | (2006.01) | |
| B05D 3/02 | (2006.01) | |
| B05B 5/00 | (2006.01) | |

(52) U.S. Cl.
USPC ......... 427/162; 427/487; 427/372.2; 118/642

(58) Field of Classification Search
None
See application file for complete search history.

(56) References Cited

U.S. PATENT DOCUMENTS

| | | | |
|---|---|---|---|
| 5,171,609 A | 12/1992 | Ury | |
| 5,418,369 A | 5/1995 | Moore et al. | |
| 5,828,071 A | 10/1998 | Bourghelle et al. | |
| 6,399,158 B1 * | 6/2002 | Kuwahara et al. | 427/513 |
| 2003/0126890 A1 * | 7/2003 | Orita et al. | 65/432 |

FOREIGN PATENT DOCUMENTS

| | | |
|---|---|---|
| EP | 1004362 A1 | 5/2000 |
| EP | 1088638 A2 | 4/2001 |
| JP | 2003095704 | 4/2003 |
| JP | 2009294254 | 12/2009 |

OTHER PUBLICATIONS

European Search Report dated Jun. 7, 2010 for Application No. EP 10153990, Munich.

* cited by examiner

*Primary Examiner* — Timothy Meeks
*Assistant Examiner* — Ina Agaj
(74) *Attorney, Agent, or Firm* — Sutherland Asbill & Brennan LLP

(57) ABSTRACT

Certain embodiments of the invention may include systems and methods curing a coated optical fiber. The method includes drawing the coated optical fiber through a gas chamber filled with a predetermined gas, drawing the fiber through a cure tube coupled to the gas chamber, and purging at least a portion of an inner surface of the cure tube with a purge gas as the coated optical fiber is drawn through the cure tube.

7 Claims, 3 Drawing Sheets

SYSTEMS AND METHODS FOR PURGING UV CURING TUBES

FIELD OF THE INVENTION

This invention generally relates to ultraviolet (UV) curing, and more particularly, to purging UV curing tubes.

BACKGROUND OF THE INVENTION

Radiation curable materials are used extensively in the production of optical fiber, particularly in the production of protective coatings that surround the optical fiber. One class of radiation curable materials can be converted from a liquid to a solid upon exposure to light energy in the ultraviolet (UV) spectrum, e.g., wavelengths ranging from about 200 to about 400 nanometers. Most UV radiation curable materials contain a monomer and oligomer mixture with an added photoinitiator package that facilitates cross-linking upon exposure to the radiation. The extent of the cross-linking reaction is dependent upon the amount of exposure to the radiation.

The coatings surrounding an optical fiber can be quickly cured by drawing the coated optical fiber past a high power UV curing lamp at a speed proportional to the radiation density provided by the curing lamp. However, it is known that atmospheric oxygen can react with certain coating materials to form peroxy radicals that can interfere with the curing process and may cause incomplete curing, particularly at the surface of the coating where the oxygen is present. Therefore, when a high degree of cure is required on the secondary or exterior coating layer, the coated fiber may be cured in an inert environment. For example, the coated fiber can be drawn through a center tube filled with inert gas (such as nitrogen) to maintain an oxygen-free atmosphere while the coating is cured. The center tube is usually made of UV transparent quartz to allow UV light to pass from the curing lamp to the fiber coatings with minimal attenuation, absorption, or scattering of the light.

During the normal UV curing process, temperatures within the UV curing tube can often reach or exceed 90 degrees Celsius due to the heat produced by the UV lamps, even with high flow rates of nitrogen. The elevated temperature can cause a portion of the uncured coating material to volatize (or off-gas) and, unfortunately, the volatiles can form deposits on the inner surface of the center tube. These coating deposits can cause significant clouding on the inner surface of the center tube and can severely attenuate the UV curing light to the point where the fiber coatings may not be sufficiently cured. Therefore, the center tubes are routinely replaced on a regular basis, often with each new preform.

A need remains for improved systems and methods for curing optical fiber coatings.

BRIEF SUMMARY OF THE INVENTION

Some or all of the above needs may be addressed by certain embodiments of the invention. Certain embodiments of the invention may include systems and methods for purging UV curing tubes.

According to an example embodiment of the invention, a method is provided for curing a coated optical fiber. The method includes drawing the coated optical fiber through a gas chamber filled with a predetermined gas, drawing the fiber through a cure tube coupled to the gas chamber, purging at least a portion of an inner surface of the cure tube with a purge gas as the coated optical fiber is drawn through the cure tube, and exposing the coated optical fiber to radiation.

According to another example embodiment, a system is provided for reducing cure tube surface contamination while curing a coated optical fiber. The system includes a curing oven comprising a radiation source, a gas chamber operable for surrounding the coated optical fiber with a predetermined gas, a cure tube coupled to the gas chamber and configured to transmit radiation from the radiation source to the coated optical fiber, and a purge gas inlet for releasing purge gas into the cure tube to purge at least a portion of the inner surface of the cure tube with a purge gas.

According to another example embodiment, an apparatus is provided for reducing cure tube surface contamination while curing a coated optical fiber. The apparatus includes a gas chamber operable for surrounding the coated optical fiber with a predetermined gas, a cure tube coupled to the gas chamber and operable to transmit radiation from the radiation source to the coated optical fiber, and a purge gas inlet for releasing purge gas into the cure tube to purge at least a portion of the inner surface of the cure tube with a purge gas.

Other embodiments and aspects of the invention are described in detail herein and are considered a part of the claimed invention. Other embodiments and aspects can be understood with reference to the following detailed description, accompanying drawings, and claims.

BRIEF DESCRIPTION OF THE FIGURES

Reference will now be made to the accompanying tables and drawings, which are not necessarily drawn to scale, and wherein.

DETAILED DESCRIPTION OF THE INVENTION

Figure 1:
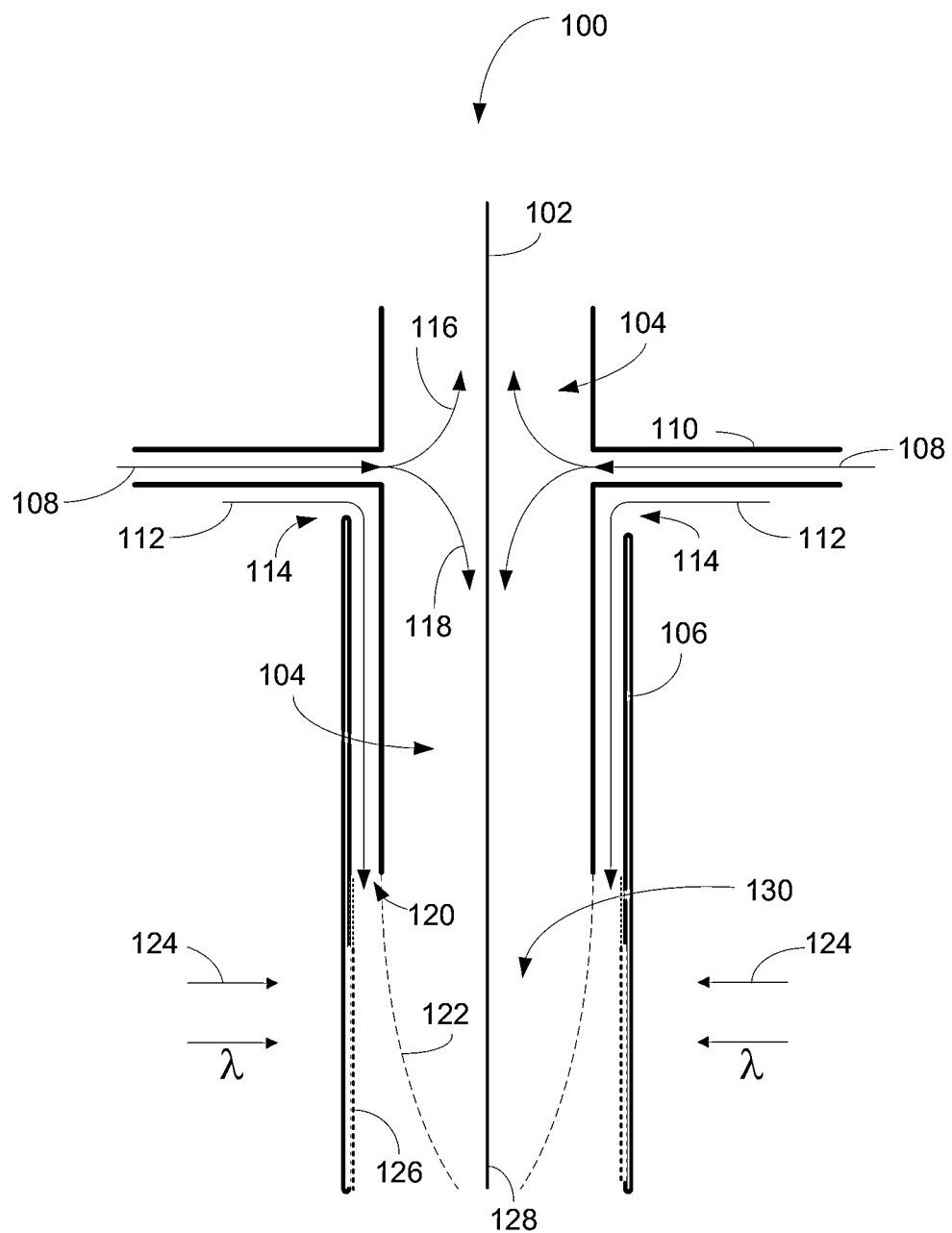
FIG. 1 is a schematic diagram of an illustrative cure tube purging system according to an example embodiment of the invention.

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Certain embodiments of the invention may enable purging of UV cure tubes (also known as center tubes) while curing optical fiber coatings. According to certain example embodiments, a purge gas comprising oxygen may be used to selectively purge at least a portion of the inner surface of a cure tube in order to reduce the build-up of deposits on the cure tube while maintaining an inert environment around the optical fiber during cure. Accordingly, the reduction or removal of deposits from the cure tube may allow more radiation from a UV lamp, for example, to reach the optical fiber coatings for a more complete and efficient cure of the coatings. Furthermore, purging the cure tube may extend the time that the cure tube may be used in a curing oven before it is removed and replaced due to excessive build-up of light attenuating deposits.

In example embodiments of the invention, a predetermined gas (such as nitrogen, helium, argon, etc.) comprising an insignificant amount of oxygen may be utilized to at least partially surround or buffer the coated optical fiber before and/or during cure. However, in certain applications, it may be desirable for a certain (limited) degree of under-cure or stickiness on the outer coating surface, for example, when the optical fiber is to be additionally coated or colored. Therefore, according to another embodiment of the invention, the coating surface properties may be controlled by adding a small amount of oxygen to the predetermined gas while, at the same time, keeping the cure tube clean with a purge gas containing more oxygen.

In example embodiments of the invention, the optical fiber coatings may include dyes or pigments for coloring and identification purposes. Furthermore, in example embodiments, the optical fiber coatings may include slickness additives or release agents to modify the surface properties of the cured coatings. Example release agents may include silicone acrylates, silicone oils, fluorocarbons, fluorocarbon oils, or fluorocarbon acrylates. In certain example embodiments, the colored optical fiber may be utilized in ribbon fiber where, for example, multiple colored fibers may be surrounded by a matrix material that can enclose and protect the multiple fibers, but may peel back to expose the individual fibers without tenaciously adhering to the coatings on the individual colored fibers. In such embodiments, the cure tube purging may enable increased control and precision in the radiation dose that reaches the optical fiber coatings, and therefore, may allow optimum curing in colorless or colored coatings, with or without a slickness additive. Therefore, according to example embodiments of the invention, the properties of the optical fiber coatings can be controlled with increased curing precision.

In certain embodiments, the purging of the cure tube can be achieved by introducing a purge gas comprising oxygen into the cure tube through, for example, an input orifice separate from the inert gas input orifice. By controlling the respective flow rates of the inert gas and the purge gas, the inert gas may effectively envelop the coated optical fiber during cure while the purge gas may effectively scrub the inner surface of the cure tube. Accordingly, when the volatiles off-gas from the uncured coating, and when the volatiles comprise carbon molecules, for example, the oxygen in the purge gas may bind with the carbon to produce carbon dioxide that can be carried away in the inert and purge gas mixture. Furthermore, once the coating on the optical fiber has been cured with the UV radiation, oxygen from the purge gas may be exposed to the optical fiber without adversely affecting the surface cure. Therefore, according to an example embodiment of the invention, the inert and purge gasses may be selectively directed so that the uncured coating on the fiber is substantially surrounded by inert gas during the cure, and the purge gas may be directed to the inner surface of the cure tube while substantially surrounding the inert gas during the cure. According to example embodiments of the invention, the inert and purge gasses can mix in the downstream regions of the cure tube, preferably after the fiber coatings have been sufficiently cured.

According to another example embodiment of the invention, non-oxygen methods, for example, nitrogen and/or ammonia glow discharge plasmas may be utilized to remove carbon build-up from an inner surface of the cure tube.

Various purging and flow control systems and methods for purging the cure tube, according to example embodiments of the invention, will now be described with reference to the accompanying figures.

FIG. 1 illustrates an example cure tube purging system 100. Depicted in this figure is a coated optical fiber 102 that may be drawn through a gas chamber 104. According to example embodiments of the invention, the gas chamber 104 may be filled with a predetermined gas such as an inert gas or noble gas. Example predetermined gasses may include nitrogen, helium, and argon. The gas chamber 104 may be coupled to a cure tube 106. According to example embodiments of the invention, the predetermined gas 108 may enter the gas chamber 104 via an inert gas delivery input bore or hose 110. The predetermined gas 108 may flow into the gas chamber 104 and comprise an inert gas upstream flow 116 (towards the coated optical fiber 102 coating mechanism, for example), and an inert gas downstream flow 118 (towards the curing oven, for example) to effectively keep oxygen from contacting the uncured fiber coating.

According to an example embodiment of the invention, purge gas 112 may be introduced into the cure tube 106 via a purge gas delivery input 114. The purge gas 112 may be preferentially directed via a purge gas inlet 120 towards the inner surface of the cure tube 106 so that the purge gas 112 may reduce surface contamination 126 build-up on the cure tube 106. The predetermined gas 108 may effectively envelop the coated optical fiber 102 in the curing region 130 to buffer the uncured coating from the purge gas 112, as depicted by the inert/purge flow approximate boundary 122. According to example embodiments of the invention, curing light from a radiation source 124 may penetrate the cure tube 106 and cure the optical fiber coating in the curing region 130. After sufficient curing, the cured optical fiber 128 may then be exposed to oxygen. The predetermined gas 108 and the purge gas 112 may freely mix in the downstream portion of the cure tube 106.

According to example embodiments of the invention, the purge gas 112 may comprise about 0.5% to about 21% oxygen, and the ratio of oxygen to inert gas in the cure tube may be at least 1:1000. According to example embodiments of the invention, the cure tube 106 may comprise quartz glass or other suitable materials that are substantially transparent to the light produced by the radiation source 124.

Figure 2:
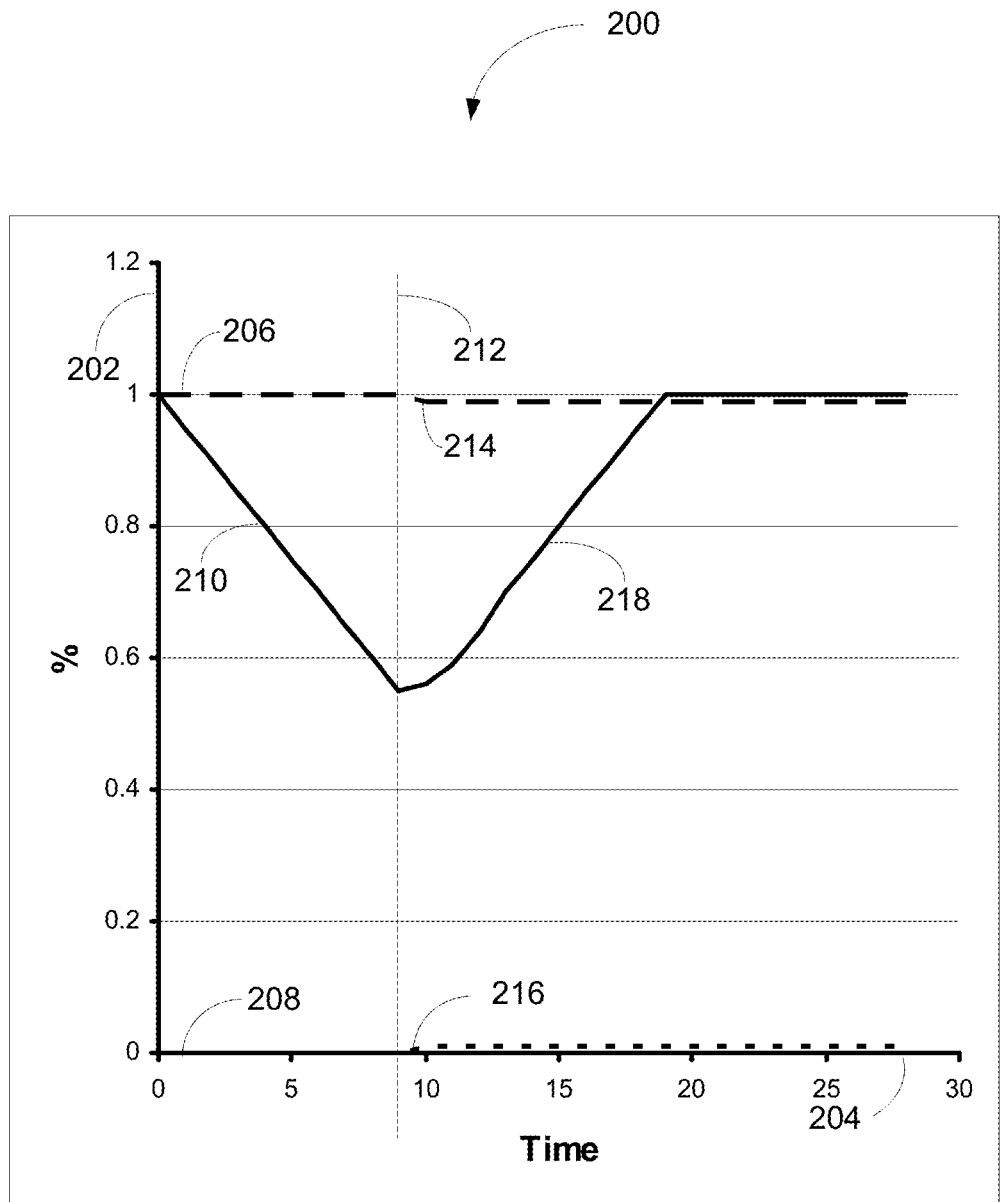
FIG. 2 is an illustrative UV transmission graph according to an example embodiment of the invention.

FIG. 2 depicts an example UV transmission graph 200 that illustrates the general effects of purging the cure tube 106 with a purge gas 112 comprising oxygen. The abscissa (x-coordinate) of the graph is time 204 (arbitrary units), and the ordinate (or y-coordinate) is percentage 202 (arbitrary units). The example UV transmission graph 200 includes three curves: an inert gas curve 206, 214 (upper dashed curve), a UV transmission curve 210, 218 (solid line curve), and an oxygen curve 208, 216 (bottom dashed curve). During the interval of time from about t=0 to about t=8, the cure tube contains 100% inert gas 206 and 0% oxygen 208. The resulting UV transmission 210 through the cure tube decreases during this time interval due to the build-up of deposits on the cure tube. Then at about time t=8, and after the time of the initial oxygen purge 212 (depicted by the vertical dotted line), the cure tube contains about 1% oxygen 216 and about 99% inert gas 214. The result is an increasing UV transmission 218 through the cure tube.

According to example embodiments of the invention, purging the cure tube with a purge gas comprising oxygen 216 can slow, or stop, or even reverse the build-up of deposits from the cure tube. Therefore, the oxygen purging can help increase the curing efficiency by reducing or eliminating deposit build-ups in the cure tube that attenuate the curing light.

Figure 3:
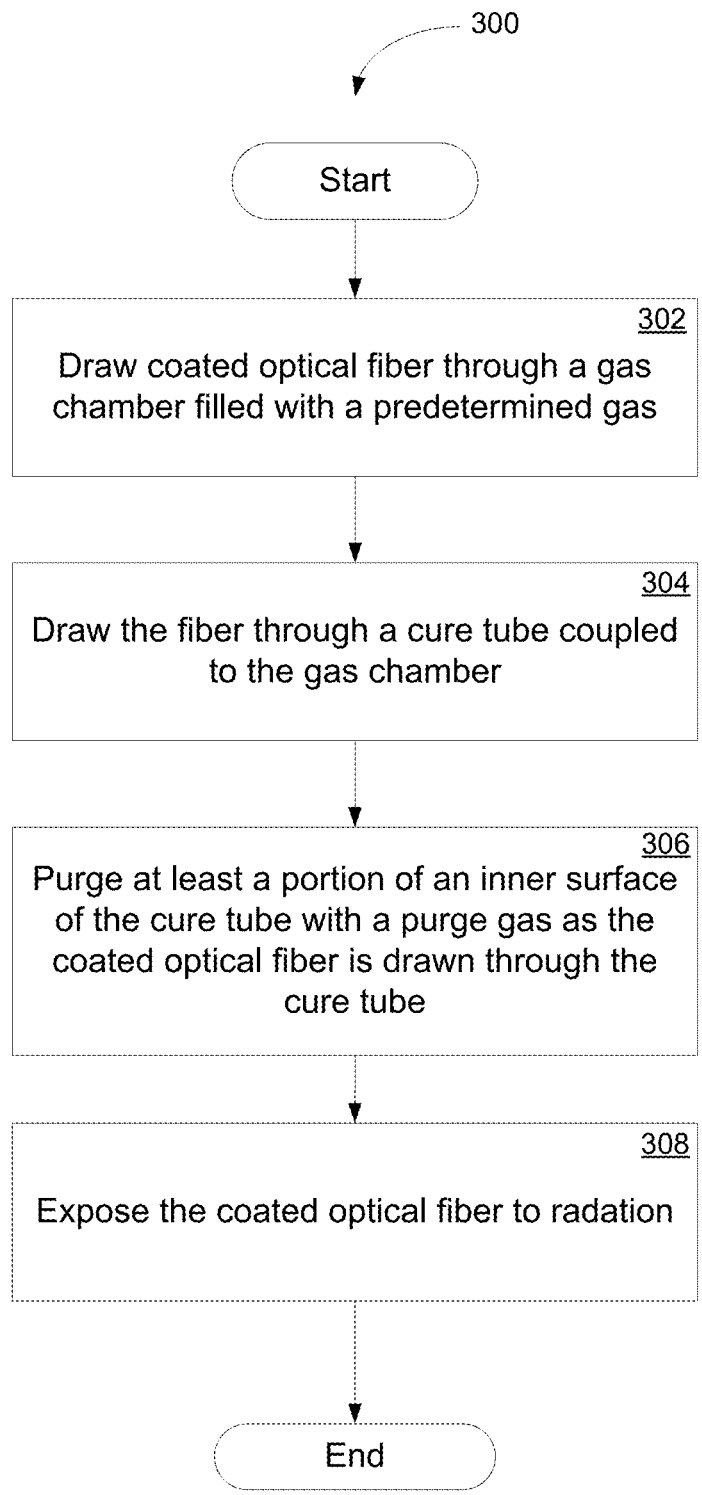
FIG. 3 is a flow diagram of a method according to an example embodiment of the invention.

An example method 300 for curing a coated optical fiber will now be described with reference to the flow diagram of FIG. 3. In block 302 and according to an example embodiment of the invention, a coated optical fiber may be drawn through a gas chamber filled with a predetermined gas. The predetermined gas may include, for example, nitrogen, argon, helium, or any other suitable inert gas having negligible amounts of oxygen. In block 304, and according to an example embodiment, the fiber may be drawn through a cure tube coupled to the inert gas chamber. In block 306, and according to an example embodiment, at least portion of an inner surface of the cure tube may be purged with a purge gas as the coated optical fiber is drawn through the cure tube. In block 308, and according to an example embodiment, the coated optical fiber may be exposed to radiation. The radiation, for example, may comprise UV light.

According to example embodiments of the invention, the flow rates of the predetermined gas 108 and the purge gas 112 may be controlled individually and/or collectively to produce the desired deposit reduction, and/or curing results for a number of cure tube purging system 100 configurations and coating formulations. Shown in Table 1 below are example measurement results for two different coating formulations (coating #1 and coating #2) at various flow rates and oxygen concentrations. For coating #1, Table 1 indicates that an oxygen concentration of 0.51% in the purge gas (upper wall) results in good coating cure results, and even this small concentration of oxygen in the purge gas is sufficient to keep the cure tube from clouding, at least for a particular configuration and overall flow rate. However when the oxygen concentration in the purge gas (upper wall) is increased above about 1%, the coating cure may be compromised.

TABLE 1

| Center N2 (LPM) | Wall N2, (LPM) | Wall Air, (LPM) | $O_2$ Percentage (average) | $O_2$ Percentage (upper wall) | Cure Tube Condition | Cure Results |
|---|---|---|---|---|---|---|
| COATING #1 | | | | | | |
| 40 | 7.6 | 0.2 | 0.09% | 0.51% | OK | good |
| 40 | 7.6 | 0.3 | 0.13% | 0.76% | OK | good |
| 40 | 7.6 | 0.4 | 0.18% | 1.00% | OK | marginal |
| 30 | 7.6 | 4 | 2.02% | 6.90% | OK | not good |
| COATING #2 | | | | | | |
| 20 | 10 | 1.2 | 1.19% | 2.25% | Clouding | good |
| 20 | 5 | 1.2 | 0.96% | 4.10% | OK | good |

For coating #2, Table 1 indicates that a certain amount of clouding in the cure tube may occur when the purge gas comprised only 2.25% oxygen (upper wall). However, increasing the oxygen in the purge gas to 4.10% may be sufficient to keep the cure tube from clouding.

Accordingly, the example values listed in Table 1 are illustrative inert gas and purge gas flow rates that may produce desired results in certain embodiments of the invention. However, different designs of the cure tube purging system 100 (e.g., systems with different cure tube diameters, fiber draw speeds, etc.) may require adjustments to the respective flow rates in order to minimize clouding of the cure tube while producing optical fiber with a good surface cure.

In example embodiments of the invention, the flow rates of the inert gas and the purge gas may be set to promote laminar flow of the purge gas against the inner surface of the cure tube, and to minimize turbulent flow of the gasses. By minimizing turbulent flow, the purge and inert gasses may not prematurely mix and expose the uncured coating to oxygen before the fiber coating surface is cured.

Accordingly, example embodiments of the invention can provide the technical effects of creating certain systems and methods that can reduce and/or remove deposits from the cure tube. The systems and methods may increase curing efficiencies by allowing more radiation from a UV lamp, for example, to reach the optical fiber coatings for a more complete cure of the coatings. Furthermore, purging the cure tube may extend the time that the cure tube may be used in a curing oven before it must be removed and replaced due to excessive build-up of light attenuating deposits.

As desired, embodiments of the invention may include the cure tube purging system 100 with more or less of the components illustrated in FIG. 1. The invention is described above with reference to the block and flow diagrams of systems, methods, and apparatuses, according to example embodiments of the invention. Some blocks of the flow diagram may not necessarily need to be performed in the order presented, or may not necessarily need to be performed at all, according to some embodiments of the invention.

While the invention has been described in connection with what is presently considered to be the most practical among various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for curing optical fibers, the method comprising:
   injecting a predetermined gas comprising an inert gas into a gas chamber via a gas delivery input bore in the gas chamber;
   drawing a coated optical fiber through the gas chamber filled with the predetermined gas;
   drawing the coated optical fiber through a cure tube coupled to the gas chamber;
   injecting a purge gas comprising oxygen into the cure tube via a purge gas inlet in the cure tube as the coated optical fiber is drawn through the cure tube, the purge gas inlet being separate from the gas delivery input bore in the gas chamber;

purging at least a portion of an inner surface of the cure tube with the purge gas as the coated optical fiber is drawn through the cure tube; and exposing the coated optical fiber to radiation.

2. The method of claim 1, wherein the purging comprises exposing at least the portion of the inner surface of the cure tube to the purge gas.

3. The method of claim 1, further comprising directing at least a portion of the predetermined gas from the gas chamber into the cure tube to at least partially buffer the coated optical fiber from the purge gas.

4. The method of claim 3, wherein the ratio of oxygen to an amount of the predetermined gas in the cure tube is at least 1:1000.

5. The method of claim 1, wherein injecting the purge gas comprising oxygen into the cure tube comprises injecting a gas comprising about 0.5% to about 21% oxygen into the cure tube.

6. The method of claim 1, wherein purging at least the portion of the inner surface of the cure tube comprises directing an amount of the purge gas towards at least the inner surface of the cure tube at a flow rate that inhibits turbulent flow.

7. The method of claim 1, wherein injecting the predetermined gas comprising the inert gas comprises injecting a gas comprising one of about 100% nitrogen, helium, argon, or a mixture of two or more of nitrogen, helium, or argon.

* * * * *